(12) United States Patent
Bouchard

(10) Patent No.: US 6,799,457 B2
(45) Date of Patent: Oct. 5, 2004

(54) BUBBLE LEVEL METER AND RELATED METHOD

(75) Inventor: Claude Bouchard, Lac à la Tortue (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 10/471,096

(22) PCT Filed: Feb. 26, 2002

(86) PCT No.: PCT/CA02/00251
§ 371 (c)(1), (2), (4) Date: Apr. 6, 2004

(87) PCT Pub. No.: WO02/071006
PCT Pub. Date: Sep. 12, 2002

(65) Prior Publication Data
US 2004/0149031 A1 Aug. 5, 2004

(30) Foreign Application Priority Data
Mar. 8, 2001 (CA) .............................. 2340139

(51) Int. Cl.⁷ .............................................. G01F 23/00
(52) U.S. Cl. ..................... 73/301; 73/290 R; 73/298
(58) Field of Search ................... 73/301, 298, 290 R

(56) References Cited

U.S. PATENT DOCUMENTS

| | | | |
|---|---|---|---|
| 2,559,436 A | 7/1951 | Isserstedt | 73/302 |
| 3,729,997 A | 5/1973 | Luke | 73/302 |
| 3,751,185 A | 8/1973 | Gottliebson et al. | 417/7 |
| 3,969,941 A * | 7/1976 | Rapp | 73/290 R |
| 3,987,675 A | 10/1976 | Harrison | 73/302 |
| 4,002,068 A | 1/1977 | Borst | 73/302 |
| 4,006,636 A | 2/1977 | Holmen | 73/302 |
| 4,422,327 A | 12/1983 | Anderson | 73/303 |
| 4,567,761 A | 2/1986 | Fajeau | 73/290 |
| 4,630,478 A | 12/1986 | Johnson | 73/299 |
| 4,669,309 A | 6/1987 | Cornelius | 73/299 |
| 4,711,127 A | 12/1987 | Häfner | 73/302 |
| 5,005,408 A | 4/1991 | Glassey | 73/301 |
| 5,052,222 A | 10/1991 | Stoepfel | 73/302 |
| 5,090,242 A | 2/1992 | Hilton | 73/302 |
| 5,115,679 A | 5/1992 | Uhlarik | 73/302 |
| 5,146,783 A | 9/1992 | Jansche et al. | 73/301 |
| 5,163,324 A | 11/1992 | Stewart | 73/302 |
| 5,167,144 A | 12/1992 | Schneider | 73/54.02 |
| 5,207,251 A | 5/1993 | Cooks | 41/83 |
| 5,279,158 A | 1/1994 | Teigen et al. | 73/302 |
| 5,309,764 A | 5/1994 | Waldrop et al. | 73/302 |
| 5,347,863 A * | 9/1994 | Richard | 73/301 |
| 5,406,828 A | 4/1995 | Hunter et al. | 73/4 R |
| 5,517,869 A | 5/1996 | Vories | 73/865.2 |
| 5,636,547 A | 6/1997 | Raj et al. | 73/299 |
| 5,650,561 A | 7/1997 | Tubergen | 73/37 |
| 5,791,187 A | 8/1998 | Chang | 73/299 |
| 5,901,603 A | 5/1999 | Fiedler | 73/299 |
| 5,953,954 A | 9/1999 | Drain et al. | 73/302 |

FOREIGN PATENT DOCUMENTS

| | | | |
|---|---|---|---|
| CA | 2171801 | 1/2000 | |
| JP | 55090820 A * | 7/1980 | G01F/23/14 |

* cited by examiner

Primary Examiner—Helen Kwok
Assistant Examiner—Rodney Frank
(74) Attorney, Agent, or Firm—Nixon Peabody, LLP; Marc S. Kaufman

(57) ABSTRACT

The invention concerns bubble level meter having a pneumatic tube connected to a gas generator and to a pressure sensor. A deflecting valve is interposed along the pneumatic tube, for deflecting the air outlet at a predetermined height from the usual lower outlet of the tube. A control circuit controls the deflecting valve and the gas generator based on predetermined set values, processes the pressure measurements obtained from the pressure sensor, checks the calibration of the sensor on the basis of the measurements and the differences in height between the tube outlet, and generates level data based on the processed pressure measurements and a calibrating coefficient. Another valve interposed between the sensor and the tube and monitored by the circuit control, enables to take into account the possible drift of the sensor.

16 Claims, 11 Drawing Sheets

NO DRIFT, NO CHANGE OF COEFFICIENT "K"

| Level meter | 520,000 | | Free air outlet (position D) | | |
|---|---|---|---|---|---|
| | | | | Calibration factors | |
| (A) Water level (m) | | 520,000 | | Original | Simulation |
| | | | (Pe) Full scale (meters) | 12,000 | 12,000 |
| (B) Electrovalve (m) | | 515,000 | (S) mV/V/Full scale | 3,00000 | 3,00000 |
| | | | (Km) meters/mV/V | 4,000 | 4,000 |
| (C) Tube outlet (m) | | 511,000 | (Kv) mV/V/Meter | 0,25000 | 0,25000 |
| | | | (D) Offset in mV/V | 0,10000 | 0,10000 |

EXAMPLES OF VALIDATION CALCULATIONS

| Results of sensor with original calibration coefficients | | | |
|---|---|---|---|
| | Meters | mV/V read | Meters read |
| (A) Water level | 520,000 | 0,10000 | 520,000 |
| (B) Electrovalve | 515,000 | 1,35000 | 520,000 |
| (C) Tube outlet | 511,000 | 2,35000 | 520,000 |
| | | Delta | 0,000 |
| | | Offset | 0,000 |

| Erroneous results by simulating calibration coefficient "mV/V/Full scale" and/or "offset" | | | |
|---|---|---|---|
| | Meters | mV/V lus | Meters read |
| (A) Water level | 520,000 | 0,10000 | 520,000 |
| (B) Electrovalve | 515,000 | 1,35000 | 520,000 |
| (C) Tube outlet | 511,000 | 2,35000 | 520,000 |
| | | Delta | 0,000 |
| | | Offset | 0,000 |

| New calibration coefficients resulting from "Delta" and calculated according to: | |
|---|---|
| mV/V read | Meters read |
| mV/V/Full scale | 3,00000 | 3,00000 |
| Meters/mV/V | 4,000 | 4,000 |
| mV/V/Meter | 0,25000 | 0,25000 |

| Water level correction with new coefficient "mV/V/Full scale" and/or "offset" | | | |
|---|---|---|---|
| | Before correction (m) | Error K (m) | Offset error | After correction (m) |
| (A) Water level | 520,000 | 0,000 | 0,000 | 520,000 |
| (B) Electrovalve | 520,000 | 0,000 | 0,000 | 520,000 |
| (C) Tube outlet | 520,000 | 0,000 | 0,000 | 520,000 |

| Percentage of efficiency et error on the whole reading | | | | | |
|---|---|---|---|---|---|
| | % Efficiency Installation | % Error Sens. (Pe) | % Error Offset (Pe) | % Error Reading (Pe) | % Error Reading |
| (B) Electrovalve | 41,67 | 0,00 | 0,00 | 0,00 | 0,00 |
| (C) Tube outlet | 75,00 | 0,00 | 0,00 | 0,00 | 0,00 |

FIG. 2

EXAMPLE "B"

CHANGE OF OFFSET ONLY

| Level meter | 520,800 | | Free air outlet (position D) |
|---|---|---|---|

| | | | Calibration factors | |
|---|---|---|---|---|
| | | | Original | Simulation |
| (A) Water level (m) | 520,000 | (Pe)Full scale(meters) | 12,000 | 12,000 |
| (B) Electrovalve (m) | 515,000 | (S) mV/V/Full scale | 3,00000 | 3,00000 |
| | | (Km) meters/mV/V | 4,000 | 4,000 |
| (C) Tube outlet (m) | 511,000 | (Kv) mV/V/Meter | 0,25000 | 0,25000 |
| | | (D)Offset in mV/V | 0,10000 | 0,30000 |

EXAMPLES OF VALIDATION CALCULATIONS

Results of sensor with original calibration coefficients

| | Meters | mV/V read | Meters read |
|---|---|---|---|
| (A) Water level | 520,000 | 0,10000 | 520,000 |
| (B) Electrovalve | 515,000 | 1,35000 | 520,000 |
| (C) Tube outlet | 511,000 | 2,35000 | 520,000 |
| | | Delta | 0,000 |
| | | Offset | 0,000 |

Erroneous results by simulating calibration coefficient "mV/V/Full scale" and/or "offset"

| | Meters | mV/V read | Meters read |
|---|---|---|---|
| (A) Water level | 520,000 | 0,30000 | 520,800 |
| (B) Electrovalve | 515,000 | 1,55000 | 520,800 |
| (C) Tube outlet | 511,000 | 2,55000 | 520,800 |
| | | Delta | 0,000 |
| | | Offset | 0,800 |

New calibration coefficients resulting from "Delta" and calculated according to:

| | mV/V read | Meters read |
|---|---|---|
| mV/V/Full scale | 3,00000 | 3,00000 |
| Meters/mV/V | 4,000 | 4,000 |
| mV/V/Meter | 0,25000 | 0,25000 |

Water level correction with new coefficient "mV/V/Full scale" and/or "offset"

| | Before correction (m) | Erreur K (m) | Offset error | After correction (m) |
|---|---|---|---|---|
| (A) Water level | 520,800 | 0,000 | 0,800 | 520,000 |
| (B) Electrovalve | 520,800 | 0,000 | 0,800 | 520,000 |
| (C) Tube outlet | 520,800 | 0,000 | 0,800 | 520,000 |

Percentage of efficiency and error on the whole reading

| | % Efficiency Installation | % Error Sens. (Pe) | % Error Offset (Pe) | % Error Reading (Pe) | % Error Reading |
|---|---|---|---|---|---|
| (B) Electrovalve | 41,67 | 0,00 | 6,67 | 6,67 | 0,15 |
| (C) Tube outlet | 75,00 | 0,00 | 6,67 | 6,67 | 0,15 |

FIG. 4

EXAMPLE "C"

CHANGE OF COEFFICIENT "K" ONLY

| Level meter | 520,600 | — Free air outlet (position D) |
|---|---|---|

| | | | Calibration factors | |
|---|---|---|---|---|
| | | | Original | Simulation |
| (A) Water level (m) | 520,000 | (Pe)Full scale(meters) | 12,000 | 12,000 |
| | | (S) mV/V/Full scale | 3,00000 | 3,20000 |
| (B) Electrovalve (m) | 515,000 | (Km) meters/mV/V | 4,000 | 3,750 |
| (C) Tube outlet (m) | 511,000 | (Kv) mV/V/Meter | 0,25000 | 0,26667 |
| | | (D)Offset in mV/V | 0,10000 | 0,10000 |

EXAMPLES OF VALIDATION CALCULATIONS

Results of sensor with original calibration coefficients

| | Meters | mV/V read | Meters read |
|---|---|---|---|
| (A) Water level | 520,000 | 0,10000 | 520,000 |
| (B) Electrovalve | 515,000 | 1,35000 | 520,000 |
| (C) Tube outlet | 511,000 | 2,35000 | 520,000 |
| | | Delta | 0,000 |
| | | Offset | 0,000 |

Erroneous results by simulating calibration coefficient "mV/V/Full scale" and/or "offset"

| | Meters | mV/V read | Meters read |
|---|---|---|---|
| (A) Water level | 520,000 | 0,10000 | 520,000 |
| (B) Electrovalve | 515,000 | 1,43333 | 520,333 |
| (C) Tube outlet | 511,000 | 2,50000 | 520,600 |
| | | Delta | -0,267 |
| | | Offset | 0,000 |

New calibration coefficients resulting from "Delta" and calculated according to:

| | mV/V read | Meters read |
|---|---|---|
| mV/V/Full scale | 3,20000 | 3,20000 |
| Meters/mV/V | 3,750 | 3,750 |
| mV/V/Meter | 0,26667 | 0,26667 |

Water level correction with new coefficient "mV/V/Full scale" and/or "offset"

| | Before correction (m) | Error K (m) | Offset error | After correction (m) |
|---|---|---|---|---|
| (A) Water level | 520,000 | 0,000 | 0,000 | 520,000 |
| (B) Electrovalve | 520,333 | 0,333 | 0,000 | 520,000 |
| (C) Tube outlet | 520,600 | 0,600 | 0,000 | 520,000 |

Percentage of efficiency and error on the whole reading

| | % Efficiency Installation | % Error Sens. (Pe) | % Error Offset (Pe) | % Error Reading (Pe) | % Error Reading |
|---|---|---|---|---|---|
| (B) Electrovalve | 41,67 | 2,78 | 0,00 | 2,78 | 0,06 |
| (C) Tube outlet | 75,00 | 5,00 | 0,00 | 5,00 | 0,12 |

FIG. 6

EXAMPLE "D"

CHANGE OF OFFSET AND COEFFICIENT "K"

| Level meter | 521,400 | | Free air outlet (position D) | | |
|---|---|---|---|---|---|
| | | | | Calibration factors | |
| | | | | Original | Simulation |
| (A) Water level (m) | 520,000 | | (Pe)Full scale(meters) | 12,000 | 12,000 |
| (B) Electrovalve (m) | 515,000 | | (S) mV/V/Full scale | 3,00000 | 3,20000 |
| | | | (Km) meters/mV/V | 4,000 | 3,750 |
| (C) Tube outlet (m) | 511,000 | | (Kv) mV/V/Meter | 0,25000 | 0,26667 |
| | | | (D)Offset in mV/V | 0,10000 | 0,30000 |

EXAMPLES OF VALIDATION CALCULATIONS

| Results of sensor with original calibration coefficients | | | |
|---|---|---|---|
| | Meters | mV/V read | Meters read |
| (A) Water level | 520,000 | 0,10000 | 520,000 |
| (B) Electrovalve | 515,000 | 1,35000 | 520,000 |
| (C) Tube outlet | 511,000 | 2,35000 | 520,000 |
| | | Delta | 0,000 |
| | | Offset | 0,000 |

| Erroneous results by simulating calibration coefficient "mV/V/Full scale" and/or "offset" | | | |
|---|---|---|---|
| | Meters | mV/V read | Meters read |
| (A) Water level | 520,000 | 0,30000 | 520,800 |
| (B) Electrovalve | 515,000 | 1,63333 | 521,133 |
| (C) Tube outlet | 511,000 | 2,70000 | 521,400 |
| | | Delta | -0,267 |
| | | Offset | 0,800 |

| New calibration coefficients resulting from "Delta" and calculated according to: | |
|---|---|
| mV/V read | Meters read |
| mV/V/Full scale | 3,20000 | 3,20000 |

<br>

| | mV/V read | Meters read |
|---|---|---|
| mV/V/Full scale | 3,20000 | 3,20000 |
| Meters/mV/V | 3,750 | 3,750 |
| mV/V/Meter | 0,26667 | 0,26667 |

| Water level correction with new coefficient "mV/V/Full scale" and/or "offset" | | | |
|---|---|---|---|
| | Before correction (m) | Error K (m) | Offset error | After correction (m) |
| (A) Water level | 520,800 | 0,000 | 0,800 | 520,000 |
| (B) Electrovalve | 521,133 | 0,333 | 0,800 | 520,000 |
| (C) Tube outlet | 521,400 | 0,600 | 0,800 | 520,000 |

| Percentage of efficiency and error on the whole reading | | | | |
|---|---|---|---|---|
| | % Efficiency Installation | % Error Sens. (Pe) | % Error Offset (Pe) | % Error Reading (Pe) | % Error Reading |
| (B) Electrovalve | 41,67 | 2,78 | 6,67 | 9,44 | 0,22 |
| (C) Tube outlet | 75,00 | 5,00 | 6,67 | 11,67 | 0,27 |

FIG. 8

BUBBLE LEVEL METER AND RELATED METHOD

FIELD OF THE INVENTION

The present invention relates to a bubble level meter having improved stability and measurement accuracy, and a method for adapting a bubble level meter to improve pressure measurements. Such a level meter is particularly useful for monitoring the water level of lakes and for any other application requiring the measurement of a liquid level.

BACKGROUND

Bubble level meters are used since many years in the field of hydrostatic pressure measurements. They are used as a result of their simplicity, their efficiency, their long-term reliability and their general accuracy in many fields such as industrial, geotechnical, oil, marine, hydrographical reservoir management, etc.

The basic principle of a bubble level meter mainly consists in opposing the pressure exerted by a water column by means of an external pressure source, generally air, until a balanced pressure or an equal pressure between the water column and the external pressure source is obtained. The external pressure source then becomes the measurement reference which, after conversion of the measured pressure, provides a height or level measurement. The conversion depends on the density of the liquid to be measured. The pressure is measured using sensors of many sorts, such as electric, electronic, optical, pneumatic, mechanical, most of which using a more or less rigid diaphragm subjected to the pressure to be measured. The pressure sensors are usually initially calibrated in laboratory by their manufacturer. This is how the calibration coefficients and factors used to calculate the pressure applied on the diaphragm are determined.

Among all the characteristics that the manufacturer of the pressure sensor will determine, the sensitivity coefficient and the offset factor of the pressure sensor are the most important ones to obtain an accurate reading of the pressure applied on the diaphragm. Unfortunately, with the passing of time, or for reasons of design, this calibration sensitivity coefficient may vary during the lifetime of the pressure sensor, typically unbeknown to the user. Certain factors may influence the measurements, such as the atmospheric pressure, an unequal density in the water column, temperature variations, humidity, corrosion, vibrations, etc. Furthermore, mechanical components or the electrical or electronic interfaces connected to the pressure sensor may highly affect the sensitivity coefficient. It is difficult to control all these components. This error phenomenon on the sensitivity coefficient can be verified, provided that the pressure sensor is subjected to a new calibration in laboratory or on site, with equipment which is very specialized at the present time. In any cases, this is very impractical. Since it is highly difficult to know when the sensitivity coefficient has changed due to unpredictable phenomena occurring in time, it is thus possible that the measurements taken by the apparatus be erroneous, which may involve very serious repercussions.

Another important point is the offset factor of the pressure sensor, which causes an error on the final result of the level reading. Contrary to the sensitivity coefficient which modifies the calibration slope of the sensor, the offset introduces a residual value which prevents the sensor from having an initial zero value for a pressure measured at zero point. The large majority of pressure sensors have an initial offset factor during their manufacture, which must be considered during the calculations based on the pressure measurements. Moreover, the offset factor generally changes with the operation time of the sensor. In the same way as the error due to a change of the sensitivity coefficient, that due to the offset factor is also important and significant on the final result. To determine the offset factor of the sensor during its operation time, it is very important to have the same initial pressure conditions.

The level meters are often installed in remote locations which are difficult to access. The doubt on a level measurement reading or, worse, an erroneous reading, may cause irreparable damages. The costs associated with the transportation of personnel for checking the level meter are often huge and represent an amount higher than the price of a new apparatus.

Known in the art are U.S. Pat. No. 3,729,997 (Luke); U.S. Pat. No. 3,751,185 (Gottliebson et al.); U.S. Pat. No. 3,987,675 (Harrison); U.S. Pat. No. 4,002,068 (Borst); U.S. Pat. No. 4,006,636 (Holmen); U.S. Pat. No. 4,422,327 (Anderson); U.S. Pat. No. 4,567,761 (Fajeau); U.S. Pat. No. 4,669,309 (Cornelius); U.S. Pat. No. 4,711,127 (Hafner); U.S. Pat. No. 5,005,408 (Glassey); U.S. Pat. No. 5,052,222 (Stoepfel); U.S. Pat. No. 5,090,242 (Hilton); U.S. Pat. No. 5,146,783 (Jansche et al.); U.S. Pat. No. 5,167,144 (Schneider); U.S. Pat. No. 5,207,251 (Cooks); U.S. Pat. No. 5,309,764 (Waldrop et al.); U.S. Pat. No. 5,406,828 (Hunter et al.); U.S. Pat. No. 5,517,869 (Vories); U.S. Pat. No. 5,636,547 (Raj et al.); U.S. Pat. No. 5,650,561 (Tubergen); and U.S. Pat. No. 5,953,954 (Drain et al.). These patents show various types of level measuring apparatuses representing the state of the art. In the cases of bubble type apparatuses, many use pneumatic tubes having different lengths to carry out differential pressure measurements. Such differential measurements have their advantages but nevertheless do not solve the problems associated with the sensitivity coefficient and the offset factor of the pressure sensors used in the apparatuses.

SUMMARY

An object of the invention is to provide a bubble level meter which allows detection and monitoring of changes at the level of the sensitivity coefficient of the pressure sensor used by the apparatus, to fully eliminate or else reduce the doubts and errors in the readings of the apparatus caused by such changes.

Another object of the invention is to provide such a level meter which allows establishing a new sensitivity coefficient for the pressure sensor, during use of the level meter.

Another object of the invention is to provide such a level meter which may correct the offset factor of the pressure sensor.

Another object of the invention is to provide a method by which a conventional bubble level meter can be adapted to determine the sensitivity coefficient and the offset factor of the pressure sensor used by the apparatus and to correct the readings of the apparatus.

According to the present invention, there is provided a bubble level meter comprising:

a pneumatic tube submersible in part and having opposite lower and upper openings;

a gas generator connected to the upper opening of the pneumatic tube;

a pressure sensor connected to the upper opening of the pneumatic tube in order to measure a pressure in the pneumatic tube;

a deflection valve interposed along the pneumatic tube above and at a predetermined distance from the lower opening, the deflection valve having a port for communication with an external liquid milieu in which a submerged portion of the pneumatic tube is located, and closed and open positions wherein the upper opening of the pneumatic tube communicates respectively with the lower opening of the pneumatic tube and the port of the deflection valve; and a control circuit connected to the gas generator, the pressure sensor and the deflecting valve, the control circuit being configured for:

processing pressure measurements obtained from the pressure sensor;

controlling the deflection valve and the gas generator as a function of preset settings;

verifying a calibration coefficient of the pressure sensor as a function of the pressure measurements obtained from the pressure sensor when the deflection valve is alternately in closed position and in open position, and as a function of the distance between the lower opening of the pneumatic tube and the port of the deflection valve; and generating level data as a function of the processed pressure measurements and the calibration coefficient.

Preferably, the level meter will further comprise:

an additional deflection valve interposed between the pressure sensor and the upper opening of the pneumatic tube, the additional deflection valve being connected to the control circuit and having a port for communication with an external atmospheric milieu in which an emerged portion of the pneumatic tube is located, and closed and open positions wherein the pressure sensor communicates respectively with the upper opening of the pneumatic tube and the port of the additional deflection valve;

and wherein the control circuit is also configured for:
controlling the additional deflection valve as function of the preset settings; and
verifying an offset factor of the pressure sensor as a function of the pressure measurements obtained from the pressure sensor when the additional deflection valve is alternately in closed position and in open position, the level data generated by the control circuit being
also as a function of the offset factor.

According to the present invention, there is also provided a method for improving pressure measurements in a bubble level meter comprising a pneumatic tube submersible in part having opposite lower and upper openings, a gas generator connected to the upper opening of the pneumatic tube, a pressure sensor connected to the upper opening of the pneumatic tube, and a control circuit connected to the gas generator and the pressure sensor and configured for processing measurements obtained from the pressure sensor and generating level data as a function of the processed measurements, the method comprising:

interposing a deflection valve along the pneumatic tube above and at a predetermined distance from the lower opening, the deflection valve having a port for communication with an external liquid milieu in which a submerged portion of the pneumatic tube is located, and closed and open positions wherein the upper opening of the pneumatic tube communicates respectively with the lower opening of the pneumatic tube and the port of the deflection valve;

connecting the deflection valve to the control circuit; and
configuring the control circuit for:
controlling the deflection valve as a function of preset settings;
verifying a calibration coefficient of the pressure sensor as a function of pressure measurements obtained from the pressure sensor when the deflection valve is alternately in closed position and in open position and as a function of the distance between the lower opening of the pneumatic tube and the port of the deflection valve; and
generating the level data as a function of the calibration coefficient.

Preferably, the method further comprises:

interposing an additional deflection valve between the pressure sensor and the upper opening of the pneumatic tube, the additional deflection valve having a port for communication with an external atmospheric milieu in which an emerged portion of the pneumatic tube is located, and closed and open positions wherein the pressure sensor communicates respectively with the upper opening of the pneumatic tube and the port of the additional deflection valve;

connecting the additional valve to the control circuit; and
configuring the control circuit for:
controlling the additional deflection valve as a function of the preset settings;
verifying an offset factor of the pressure sensor as a function of the pressure measurements obtained from the pressure sensor when the additional deflection valve is alternately in closed position and in open position; and
generating the level data as a function of the offset factor.

BRIEF DESCRIPTION OF THE DRAWINGS

A detailed description of the preferred embodiments of the invention will be given hereinafter in reference with the following drawings, wherein the same reference numerals refer to identical or similar elements:

FIGS. 2 to 11 are tables and graphs illustrating examples of calculations of water levels, calibration coefficients and offset factors under different possible conditions of the level meter according to the invention.

DETAILED DESCRIPTION OF THE PREFERRED EMBODIMENTS

Figure 1:
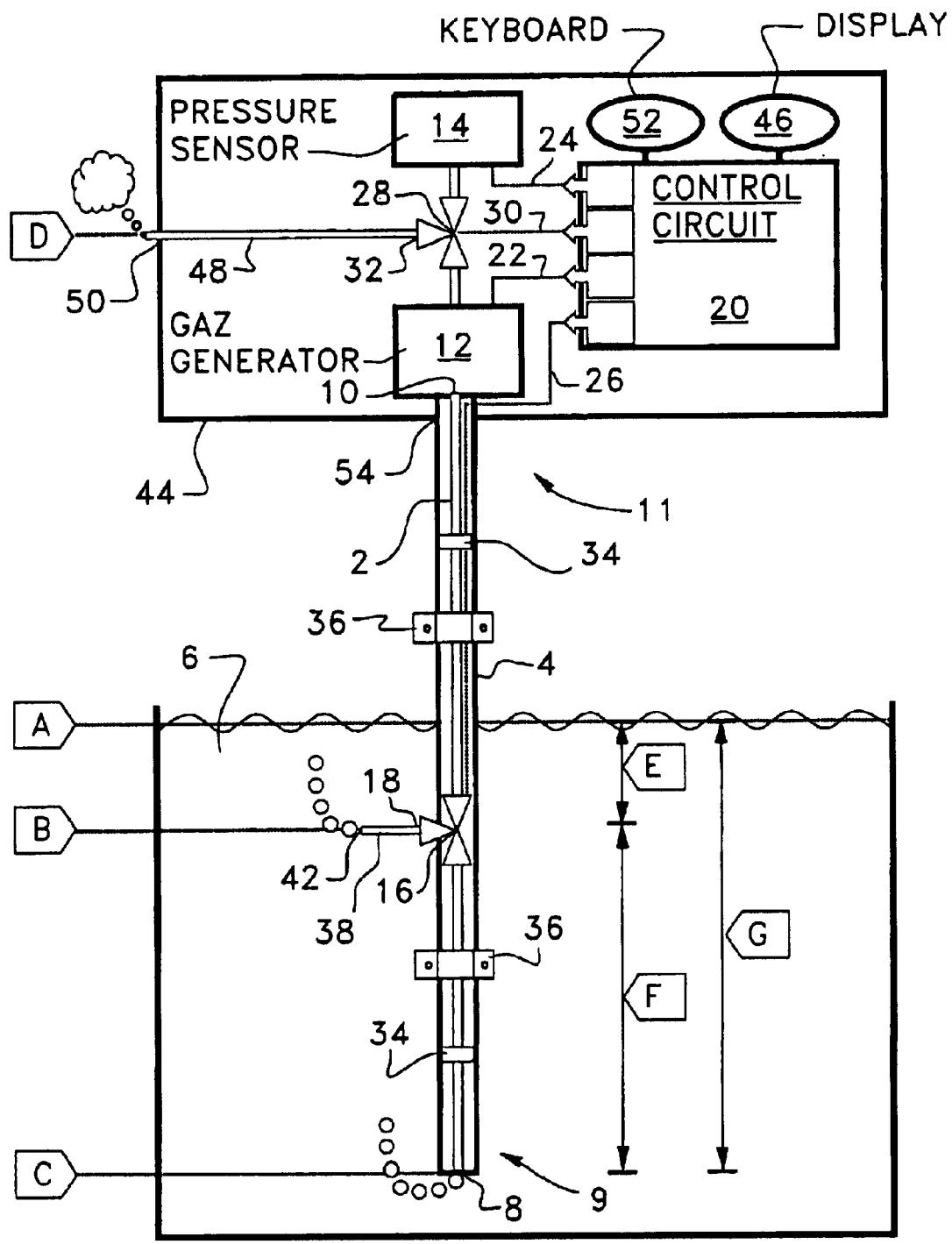
FIG. 1 is a schematic diagram of a bubble level meter according to the invention.

Referring to FIG. 1, there is shown a bubble level meter according to the invention. The level meter comprises a pneumatic tube 2 intended to be partially immerged in a body of water 6, e.g. a lake or a reservoir, or any other liquid whose level is to be measured or to be monitored. The pneumatic tube 2 has opposite lower and upper openings 8, 10. A gas generator 12, e.g. of air, is connected to the upper opening 10 of the tube 2. A pressure sensor 14 is also connected to the upper opening 10 of the tube, in order to measure a pressure in the pneumatic tube 2.

A deflection valve 16 is interposed along the pneumatic tube 2 above and at a predetermined distance from the lower opening 8. The deflection valve 16 has a port 18 for communication with an external liquid milieu, e.g. the water 6, in which a submerged portion 9 of the pneumatic tube 2 is located, and closed and open positions wherein the upper opening 10 of the tube 2 communicates respectively with the lower opening 8 and the port 18 of the valve 16. The function of the deflection valve 16 is to allow verification and optionally a correction/update of the calibration coefficient(s) of the pressure sensor 14. More details concerning the operation mode of the deflection valve 16 are provided hereinafter.

A control circuit 20 is connected to the gas generator 12, the pressure sensor 14 and the deflection valve 16, for example through lines 22, 24, 26 respectively. The control circuit 20 is configured for processing pressure measurements obtained from the pressure sensor 14, controlling the deflection valve 16 and the gas generator 12 as a function of preset settings, verifying the calibration coefficient of the pressure sensor 14 as a function of the pressure measurements obtained from the sensor 14 when the deflection valve 16 is alternately in closed position and in open position and as a function of the distance F between the lower opening 8 of the pneumatic tube 2 and the port 18 of the deflection valve 16. The control circuit 20 is also configured for generating level data as a function of the processed pressure measurements and the calibration coefficient. More information on the operation of the circuit 20 is provided hereinafter.

An additional deflection valve 28 is preferably interposed between the pressure sensor 14 and the upper opening 10 of the pneumatic tube 2. The valve 28 is connected to the control circuit 20 for example through the line 30, and has a port 32 for communication with an external atmospheric milieu, e.g. ambient air, in which an emerged portion 11 of the pneumatic tube 2 is located, and closed and open positions wherein the pressure sensor 14 communicates respectively with the upper opening 10 of the tube 2 and the port 32 of the valve 28. The function of the deflection valve 28 is to allow verification and optionally a correction/update of the offset factor of the pressure sensor 14. More details regarding the operation mode of the deflection valve 28 are provided hereinafter. The control circuit 20 is configured for controlling the additional deflection valve 28 in the same way as for the other valve 16, and for verifying the offset factor of the sensor 14 as a function of the pressure measurements obtained from the sensor 14 when the valve 28 is alternately in closed position and in open position. The control circuit 20 then takes the offset factor into account when generating the level data.

The on-site assembly and installation of the main components of the apparatus are simple and require little space. To obtain a measurement of the water level G with the level meter, the pneumatic tube 2 must be immerged into the water. The tube 2 is lowered at the minimum elevation C to be measured in the body or reservoir of water 6. Preferably, the tube 2 is secured to the walls of the body or reservoir of water 6. The lower end reference of the tube 2 is important for accurate results on the final elevation of the measurement. The lower end of the tube 2 should be free from any object or other element which could block the air outlet 8.

In certain cases where hostile environment prevails, the tube 2 will preferably be protected by a sheath or a protection tube 4, preventing an object or debris to damage or squeeze the tube 2. The pneumatic tube 2 can be fastened to the protection tube 4 by means of attachments 34 while the protection tube 4 can be secured to the walls of the body of water by means of other attachments 36. Preferably, the protection tube 4 should not exceed the lower end of the pneumatic tube 2.

The upper opening 10 of the pneumatic tube 2 is then connected to the air generator 12. The pressure produced by the air generator 12 must be sufficient for opposing the water pressure which is exerted at the lower end of the pneumatic tube 2.

The pneumatic tube 2 and the air generator 12 are connected to the pressure sensor 14 which can be electrical, electronic, pneumatic, or of another type. The pressure sensor 14 will preferably be integrated, along with electronic control components schematized by the control circuit 20, to the level meter. With these elements so assembled, it becomes possible to obtain a reading of the pressure which is exerted at the lower end of the pneumatic tube 2.

The pressure of air simultaneously applied on the pressure sensor 14 will be determinable with a very high accuracy by injection of a pressure of air equal to or balanced with the pressure exerted by the water column G above the lower opening 8 of the pneumatic tube 2. The precise moment of balance between the water pressure at the lower opening 8 of the pneumatic tube 2 and the pressure of air injected in the pneumatic tube 2, represents the measurement of the water level A. This pressure will be transformed afterwards in a water height G located above the lower opening 8 forming the air outlet of the pneumatic tube 2.

An advantage of the lever meter resides in the fact that all the precision measurement components are outside the body or reservoir of water 6 to be measured. The pressure sensor 14, the electronic control components 20, the air generator 12, etc., are located outside a milieu which is very often hostile to the various components which constitute the level meter. Thus, it then becomes possible to control the elements which generally impair the stability of these components, such as the temperature, humidity, corrosion, vibration, etc., which may affect the final accuracy of the measurement of the level A. It is also very advantageous to have the components outside the water 6 for their maintenance and their repair if need be.

Cancellation of the offset in time of the pressure sensor 14 is achieved by subjecting the sensor 14 to free air D before each pressure measurement operation. By measuring this new reading of the offset at free air D, the difference which may appear with respect to the initial offset of the sensor 14 can be mathematically and electronically cancelled or even better, this offset can be subtracted from the final reading of the pressure measured by the sensor 14.

Regarding the calibration of the sensor 14, it consists of using the water column F which will be pre-established and maintained during the use of the level meter. It must be understood that this water column F, known by the user at the time of the on-site installation of the apparatus, represents also a distance F between two precise points B, C located inside the body or reservoir of water 6. This distance F converted in water pressure, determined in advance during the initial installation of the apparatus, allows to verify if the measured pressure is correct as a function of the original sensitivity coefficient of the pressure sensor 14.

The proposed method allows the user to verify if, for any reason, the pressure sensor 14 has maintained its original sensitivity coefficient. By means of this method, the user can also know, with precision, the errors on levels A caused by the sensitivity coefficient. This represents a major trump for bubble level meters. Thus, the necessary corrections can be achieved so as to obtain a precise and accurate measurement of the level A.

To achieve this important verification, the principle is to temporarily deflect the air from the lower end of the outlet 8 of the pneumatic tube 2 by means of the bi-directional solenoid valve 16 or any other device which provides the same result. The solenoid valve 16 fulfills two important functions, namely that in closed position, the air injected inside the pneumatic tube 2 fully and only goes to the outlet 8 of the pneumatic tube 2 (normal operating principle of the bubble level meter) and that in open position, the air injected inside the pneumatic tube 2 is deflected totally and only at the installation level B of the solenoid valve 16.

The solenoid valve 16 allows to obtain a fixed reference water pressure column F. This distance F fixed between two different air outlet points B, C implies that the pressure is always identical between these two measurement points provided that the water level A remains the same during the reading of these two measurement points. By deflecting the air outlet 8 at a known distance F, it becomes possible to verify the behaviour of the pressure sensor 14 for a distance F already known and established during the installation of the apparatus. Since the distance F between the air outlet 8 with respect to the outlet 18 of air deflected at the solenoid valve 16 is known, the measurement F can be associated to a corresponding pressure.

This method allows to verify with great accuracy that the original sensitivity coefficient of the pressure sensor 14 is valid. This verification corresponds to a single level of pressure applied on the pressure sensor 14. With this method, it is assumed that the pressure sensor 14 is linear over the totality of its full range. The linearity of a pressure measurement sensor remains generally very good, except of course when its measurement diaphragm has been deformed or damaged by pressures exceeding its full measurement range. Since this approach confirms a single reference point on the original calibration curve of the sensor 14, the same air deflection principle can be applied on several different elevation levels, with only one pneumatic tube 2. It then becomes possible to verify if the sensor 14 is linear for its full measurement scale.

With the positioning of the solenoid valve 16, it is possible, in addition to verifying that the original sensitivity coefficient of the sensor 14 has remained unimpaired, to establish in the opposite situation, a new sensitivity coefficient for the sensor 14. This same verification method allows also to determine the pressure or water level height reading error caused by a variation of the sensitivity coefficient. The air deflection on a same pneumatic tube 2 allows the user to verify and to know, with accuracy and at all times, the errors produced on the measurement of the water level A.

The method of verifying and correcting the sensitivity coefficient of the pressure sensor 14, combined with the possible correction of the offset of the sensor 14, is a simple, efficient and costless means to ascertain the validity of the reading of the sensor 14 with all its components located inside the bubble level meter.

The control circuit 20 can be provided with a memory for storing the level data for later processing, and the settings and/or operation parameters of the circuit 20. The control circuit can also be provided with a display device 46 for displaying for example the measurement results, the operating parameters and modes of the level meter, etc. The sensitive components of the level meter such as the gas generator 12, the pressure sensor 14 and the control circuit 20 can be disposed in an enclosure 44 for protecting them from bad weather. The outlet 32 of the valve 28 can then be connected to a tube 48 exiting a lateral opening 50 of the enclosure and leading to the external atmospheric milieu, whereas the pneumatic tube 2 can be inserted in a lower opening 54 of the enclosure to communicate with the gas generator 12 and the pressure sensor 14.

Figure 3:
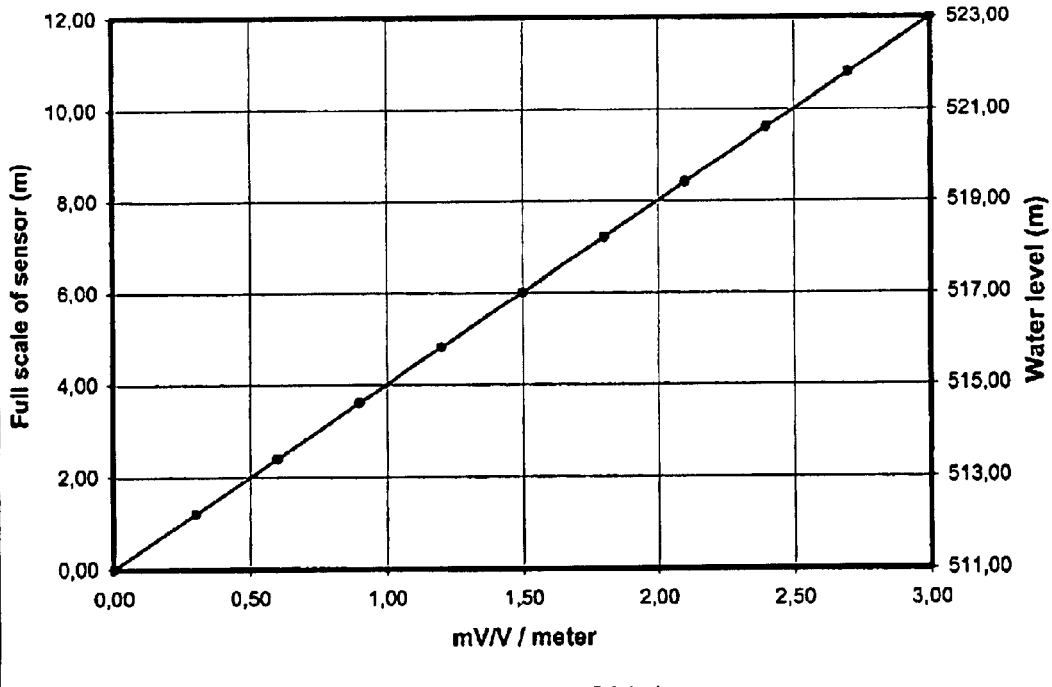
Figure 5:
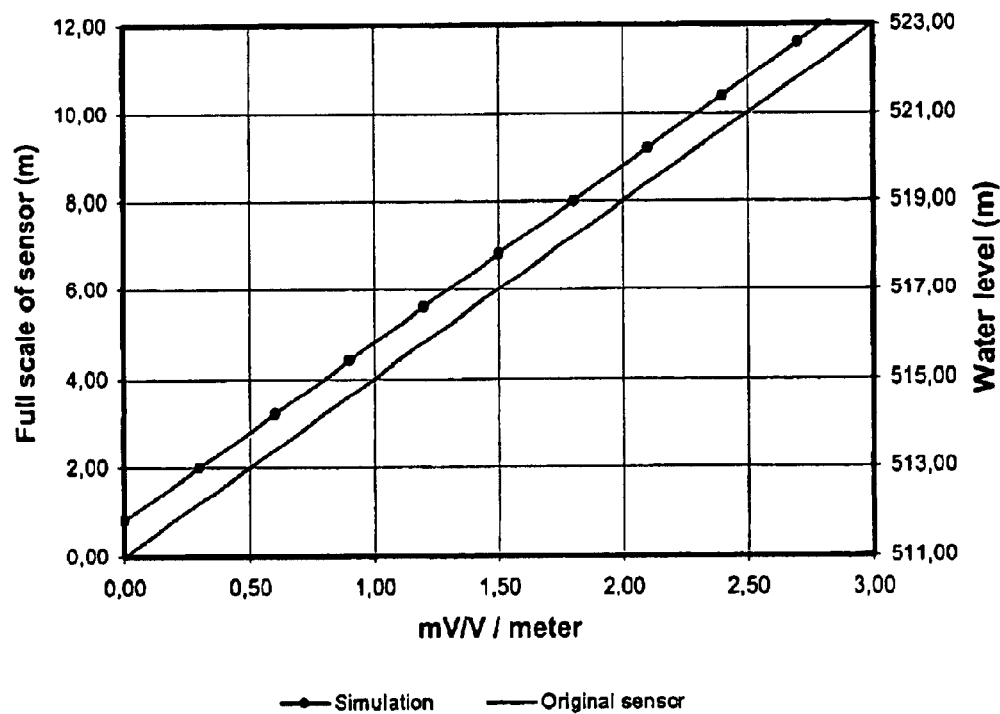
Figure 7:
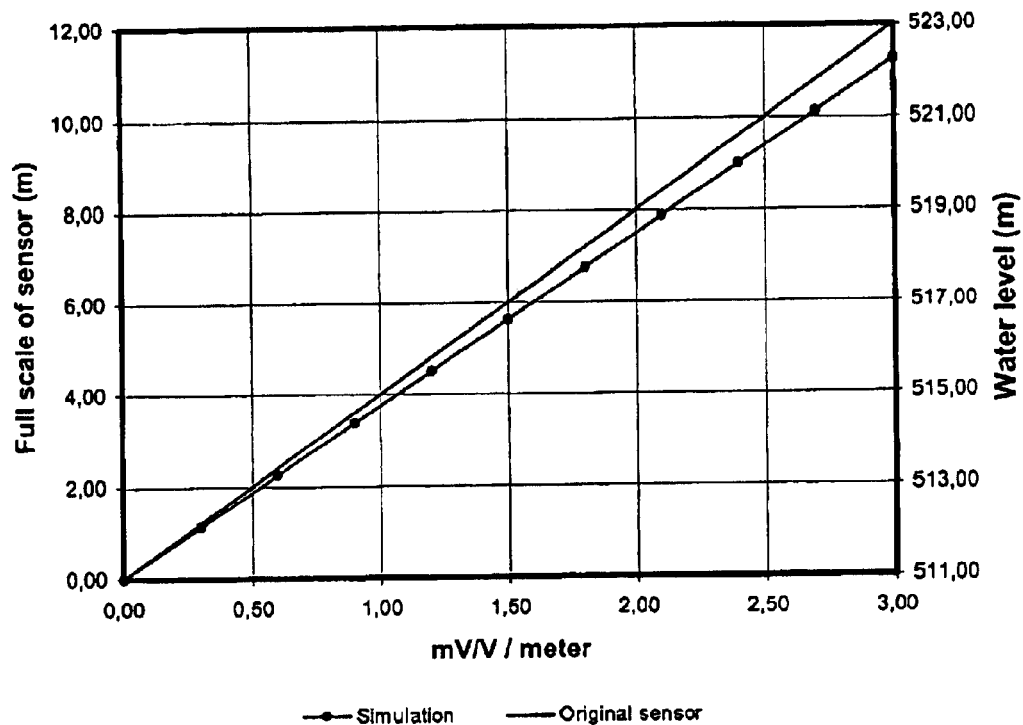
Figure 9:
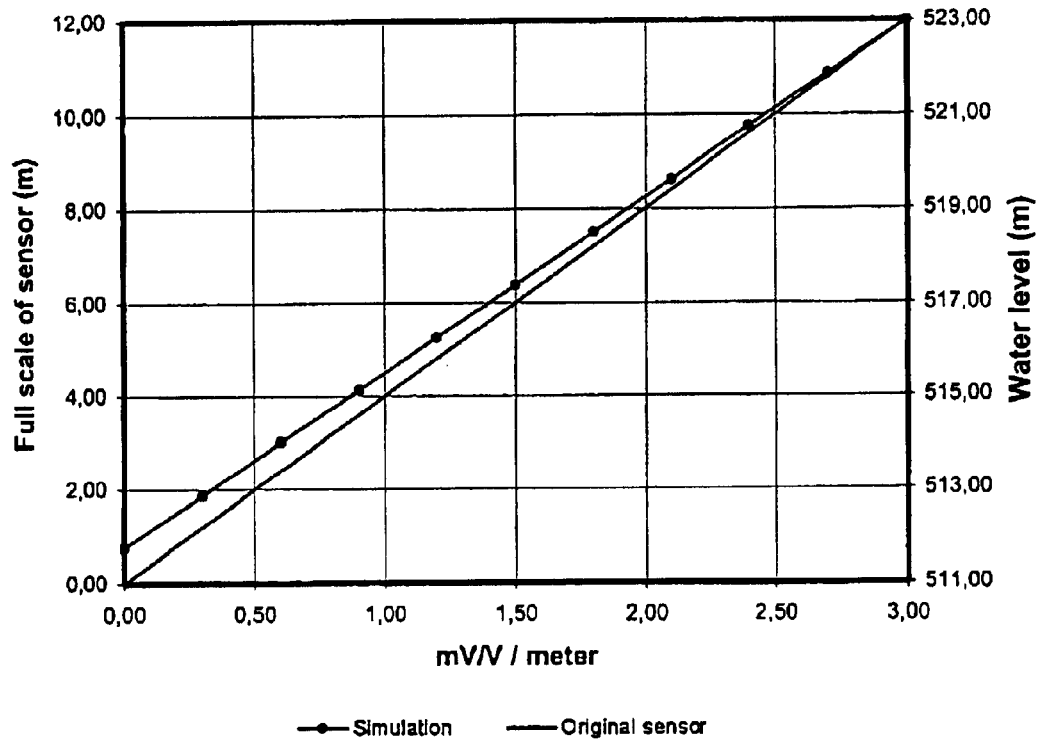
Figure 10:
Figure 11:
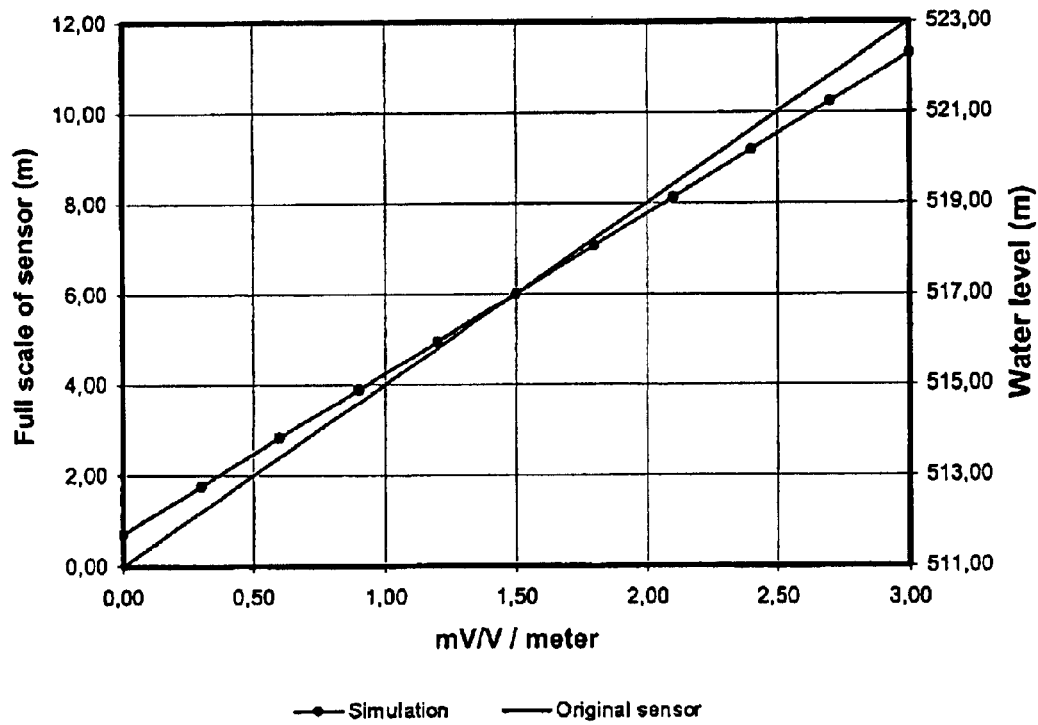

FIGS. 2 to 11 provide examples of calculations of water levels, of calibration coefficients and of offset factors under different possible conditions of the level meter according to the invention. FIG. 2 shows simulated typical data when there is no offset and no variation of the calibration coefficient of the sensor 14. FIG. 3 shows the results obtained with (line with marks) and without (line without marks) verification of the offset and of the calibration coefficient of the sensor 14 under this condition. FIG. 4 shows simulated typical data when there is a possible variation of the offset of the sensor 14 only. FIG. 5 illustrates the results obtained with (line with marks) and without (line without marks) verification of the offset and of the calibration coefficient of the sensor 14 under this condition. FIG. 6 shows simulated typical data when there is a possible variation of the calibration coefficient of the sensor 14 only. FIG. 7 illustrates the results obtained with (line with marks) and without (line without marks) verification of the offset and of the calibration coefficient of the sensor 14 under this condition. FIGS. 8 and 10 show simulated typical data when there are two types of possible variations of the offset and of the calibration coefficient of the sensor 14. FIGS. 9 and 11 illustrate the results obtained with (line with marks) and without (line without marks) verification of the offset and of the calibration coefficient of the sensor 14 under these conditions.

The parameters generally established by the manufacturer of the pressure sensor 14 are: the initial full scale $P_E$ of the sensor (in meters); the initial sensitivity $S_O$ of the sensor at full scale (in mV/V); the initial calibration coefficient $K_{M_0}$ (in meters/mV/V); and the initial calibration coefficient $K_{V_0}$ (in mV/V/meter). These basic data are initially integrated into the level meter.

The efficiency of the sensor 14 is directly related to the final accuracy on the measurement of level A. The choice of the full measurement scale of the sensor is also determinant with respect to the desired sensitivity over the variations of the water level A. It is necessary to ensure having a good ratio between the full measurement scale of the sensor 14 and the maximum level to be measured. If for different circumstances this ratio is too low, the final accuracy over the variation of the water level A is likely to be affected. Of course, all the associated components which supply or control the sensor 14 must be chosen so as to not reduce its accuracy. The electronic components such as: power supply, analog to digital converter, digital to analog converter, etc., must preferably correspond to selection criteria which follow closely the original characteristics of the pressure sensor 14.

The elevations $E_{A_0}$, $E_{B_0}$ and $E_{C_0}$ (in meters) of the water level, of the solenoid valve 16 and of the outlet 8 of the tube 2, respectively, must be measured during the on-site installation of the level meter. These initial elevations of the measurement points, namely the elevation B of the solenoid valve 16 and the elevation C of the lower end 8 of the pneumatic tube 2 are at the base of the subsequent calculations, in order to obtain an exact reference on the water level A which is to be measured. These initial parameters should preferably be obtained with an accurate geodesic measurement system or any other system which will be capable of relating the initial elevations of the two measurement points B, C to a reference elevation already established.

These elevation references of the measurement points B, C must not change at any time after the installation of the apparatus. These elevations B, C are the references to which the heights E, G of the measured water columns will be respectively added in order to obtain the final elevation A of the body of water 6. Any variation of the elevation B, C could cause an error on the final result of the reading of the water elevation A as well as on the application of the correction of the sensitivity coefficient of the pressure sensor 14.

As previously mentioned, the choice of the full scale of the pressure sensor 14 is determinant for the final sensitivity of the results. The initial positioning of the air outlet 8 at the lower end of the pneumatic tube 2 will thus be in direct relation with this choice of full measurement scale of the sensor 14. The position or elevation C of the lower end of the tube 2 indicates the reference to which the measured water height G which is located above this lower end of the tube 2 will be added. The choice of the elevation B of the solenoid valve 16 is determinant for the application of the method of air deflection located at the solenoid valve 16. The major and critical point in the application of the method is that the final elevation B of the solenoid valve 16 must remain at all times lower than the minimal elevation of the water body which will be measured. The air deflection system of the solenoid valve 16 becomes dysfunctional in this particular case. It is important to properly foresee this situation during the initial installation of the measurement system.

In order that the verification of the sensitivity coefficient of the pressure sensor 14 be the most efficient as possible, the solenoid valve 16 must preferably be installed as close as possible to the minimal elevation of the body of water to be measured. When so installed, there is obtained an excellent efficiency ratio with respect to the full scale of the pressure sensor 14. It must be well understood that the installation distance F between the air outlet 8 and the air outlet 18 represents the pressure reading which will be compared to verify the sensitivity coefficient of the pressure sensor 14. Thus, the more the distance F between these two measurement points will be important, the more the pressure reading will be representative of the full scale of the pressure sensor 14.

It is also possible with the air deflection method to add a second solenoid valve (not illustrated), in order to have a shorter distance with respect to the lower end of the outlet 8 of the pneumatic tube 2. Thus, it could be possible to verify the sensitivity coefficient of the pressure sensor 14 at minimal and maximal pressures of the full scale of the sensor 14.

The elevation D of the free air outlet 32 which is in direct relation with the offset factor of the pressure sensor 14, can be considered as a reference value for the apparatus, since many solutions are possible to correct this offset error. One of the most efficient ways to cancel this offset of the pressure sensor 14 is to subject this same sensor 14 to free air D, by means of the bidirectional solenoid valve 28. This method ensures that the sensor 14 is subjected to no pressure except that of the ambient air where the apparatus is located. With this method, it is ensured that the pressure sensor 14 measures an initial offset which is only caused either by the change of atmospheric pressure or by components connected to this same pressure sensor 14.

Many elements, other than the atmospheric pressure, may contribute to the total offset of a level meter. These offset elements are often related to residual mechanical constraints of the pressure sensor 14, of the electric or electronic components 20 of the whole measurement system which are more or less steady with the operation time, and numerous other non-negligible points to obtain an accurate pressure measurement. Even if it is possible to mathematically cancel this offset with the free air deflection solenoid valve 28, it is good to know the initial offset of the pressure sensor 14. This allows to verify if the pressure sensor 14 or the other auxiliary components connected to the pressure sensor 14 have undergone degradation during the lifetime of the apparatus.

During the installation of the level meter, the initial readings of the pressure sensor 14 are important references which are used to verify that the sensor 14 properly operates at the time of its installation. The readings $L_{D_0}$, $L_{B_0}$ and $L_{C_0}$ (in mV/V) at free air, at the outlet of the solenoid valve 16 and at the outlet 8 of the tube 2 are respectively taken for this purpose.

The initial reading at free air D can be optional in the case where the apparatus is, deprived of a valve 28. It must be, in this particular case, assumed that the offset of the sensor 14 and of the auxiliary components will be identical for the whole lifetime of the apparatus. In the case where the pressure sensor 14 is subjected to free air D before each measurement operation, and that the reading of the offset so obtained is corrected from the final reading of the sensor 14, this offset reading becomes a highly important reference for the application of the following equations.

The initial on-site reading of the offset is also important for following up the total offset of the measurement system during the whole installation lifetime of the apparatus. It is the suggested and recommended solution.

For properly verifying the sensitivity coefficient of the pressure sensor 14, it is recommended to have a quasi-instantaneous reading between the outlet 8 of the lower end of the pneumatic tube 2 and the air deflection 18 of the solenoid valve 16. The logic sequence for optimizing a measurement with the control circuit or microprocessor 20 is important. In verification mode, the microprocessor 20 actuates the solenoid valve 28 of the free air outlet 32 in open position. At this precise moment, the solenoid valve 16 of the air deflection 42 of the pneumatic tube 2 must be in closed position. This allows to maintain the full and existing pressure inside the pneumatic tube 2. After an offset reading of the pressure sensor 14, the microprocessor 20 actuates the solenoid valve 28 in closed position. Thereby, it will be possible to obtain a pressure reading at the lower end of the pneumatic tube 2. Finally, the microprocessor 20 actuates the solenoid valve 16 in open position. This last action allows to obtain the pressure of the water located above the tube outlet 38 of the air deviation connected to the outlet 18 of the solenoid valve 16. After this last sequence, the microprocessor 20 sets the solenoid valve 16 back in closed position. This resets the measurement apparatus in normal reading position.

A reading at free air $L_D$ is preferably achieved before the reading of the two measurement points $L_B$ and $L_C$. With the following equations, it is assumed that the offset measured at the pressure sensor 14 is not different between the time of the reading located at the lower end C and the air deflection B. The elevation of the water level A (in meters) from the readings taken at the levels B and C can be calculated by:

$$E_{A_{B,C}} = (L_{B,C} - L_{D_0}) \times K_M + E_{B_0,C_0}$$

An important point during the measurement at B and at C is that the water level A must preferably remain as steady as possible during this measurement period for having a good accuracy during the mathematical verification of the sensitivity coefficient. A fast execution between the readings is necessary.

Once two readings of the water level A have been obtained, it is possible to immediately compare the results to detect if the original sensitivity coefficient of the pressure sensor 14 has changed. The delta (in meters) caused by the variation of the calibration coefficient between the two calculated water levels $E_{A_B}$, and $E_{A_C}$ is calculated by:

$$\Delta E_{A_{BC}} = E_{A_B} - E_{A_C} = (L_B - L_C) \times K_{M_0} + E_{B_0} - E_{C_0}$$

In the case where the difference obtained between the two measured elevations is equal to zero, it can be concluded that the original sensitivity coefficient of the pressure sensor 14 has remained exact. Conversely, if there is obtained a difference between the two measured elevations non-equal to zero, it can be deduced or affirmed that the pressure sensor 14 has a more or less significant error on its original sensitivity coefficient. This value does not represent, at this moment, an error in meters on the final result of the elevation A of the level measurement.

Mathematically, it can also be affirmed that the level reading difference between the lower end of the outlet 8 of the pneumatic tube 2 and the air deflection 18 of the solenoid valve 16 must correspond to the difference of the original elevation of the on-site installation B, C of the two same air outlets 8, 18 on the pneumatic tube 2.

With these verifications, it is possible to correct the sensitivity coefficient with the following formulas.

Following the verification of the sensitivity coefficient, the offset of the pressure sensor 14 is verified and calculated should this error must be taken into account in the next calculations. This can be achieved by:

$\Delta D = D - D_0 = L_{D-Ld_0}$ in mV/V with $D_0 = L_{D_0}$ representing the initial offset of the sensor, in mV/V, and $D = L_D$ representing the on-site offset, in mV/V.

With this calculation method, a follow-up of the offset since on-site installation of the sensor 14 is ensured, or even better, the evolution of the offset since manufacture of the apparatus can be monitored. The subsequent equations indicate a correction of the offset since the on-site installation of the apparatus.

In the case where the difference between the on-site original offset reading and the actual offset reading is equal to zero, this indicates that the pressure sensor 14 as well as all the other related or auxiliary components connected to the sensor 14 have remained identical.

Conversely, if there is obtained a value different from zero, it can be affirmed that the sensor 14 has a more or less significant error on the final result of the measurement of the water level A. This value represents at this moment a difference in mV/V in excess to or under the final result of elevation of the measurement of the water level A.

With the previous verifications made, it becomes possible to associate a new sensitivity coefficient for the pressure sensor 14, to correct the offset error and to know all the errors related to these two precision phenomenon of the apparatus. The calculation of the new calibration coefficient can be achieved using the formulas:

$$S = P_E \times \frac{(L_C - L_B)}{(E_{B_O} - E_{C_O})},$$

S representing the calculated sensitivity of the sensor on the full scale, in mV/V;

$$K_M = \frac{P_E}{S} = \frac{(E_{B_O} - E_{C_O})}{(L_C - L_B)},$$

$K_M$ representing the calculated calibration coefficient, in meters/mV/V; and $$K_V = \frac{1}{K_M},$$

$K_V$ representing the calculated calibration coefficient, in mV/V/meter.

With these equations, it is possible to calculate a new sensitivity coefficient for the pressure sensor 14 with respect to its full measurement scale. These equations are based on the fact that the relation between the difference of the elevation C of the lower end of the outlet 8 of the pneumatic tube 2 and the elevation B of the air deflections 18 of the solenoid valve 16 as well as the difference between the obtained reading of the level A at the two measurement points should be identical.

The other calibrations coefficients can be calculated based on the same principle It is possible to use only the new sensitivity coefficients to determine the other calibration coefficients. It is generally this method which is used by the manufacturers of pressure sensors.

With this new sensitivity coefficient and the other calibration coefficients, the original coefficients of the apparatus can be replaced if more accurate and precise subsequent readings of the level A are desired. Only the value of the full scale of the pressure sensor 14 remains the same at all times.

The error caused by the offset of the sensor 14 can be easily expressed in water meters. The following equations take the original sensitivity coefficient of the pressure sensor 14 into account. With the following equations, it is possible to calculate the error in meters due to an offset of the pressure sensor 14. This error in meter is based on the principle of the verification established on-site between the reading of the free air outlet D and the initial reading of the offset of the sensor 14:

$$C_{D_A}, C_{d_B}, C_{D_C} = \Delta D \times K_{M_0} = (L_{D,B,C} - L_{D_0}) \times K_{M_0}, \; C_{D_A}, C_{D_B}, C_{D_C}$$

representing the error calculations of the water level A caused by the offset of the sensor with readings at free air D and at elevations B and C, respectively (in meters).

The previous equations establish an error in meters related to the original sensitivity coefficient. The error is presumed identical for both measurement points B, C since only one reference reading at free air D has been carried out (a positive value indicates a rising water level). It is also assumed that the sensitivity coefficient has remained the same between the time of the measurement at free air D and the other measurement points B, C.

It is also possible to mathematically find the error of level A of each measurement due to an erroneous sensitivity coefficient. With the following equations, it is possible to determine with accuracy the deviation of the level A measured at the lower end of the outlet 8 of the pneumatic tube 2 as well as at the air outlet 18 deflected by means of the solenoid valve 16 (a positive value indicates a rising water level):

$$C_{K_B} = (E_{A_B} - C_{D_B} - E_{B_O}) \times \frac{(E_{A_C} - E_{A_B})}{((E_{A_C} - E_{A_B}) - (E_{C_O} - E_{B_O}))},$$

$C_{K_B}$ representing the calculation of the error of the water level A caused by the variation of the calibration coefficient calculated with a reading in B, in meters; and $$C_{K_C} = (E_{A_C} - C_{D_C} - E_{C_O}) \times \frac{(E_{A_C} - E_{A_B})}{((E_{A_C} - E_{A_B}) - (E_{C_O} - E_{B_O}))},$$

$C_{K_C}$ representing the calculation of the error of the water level A caused by the variation of the calibration coefficient calculated with a reading in C, in meters.

These readings take the offset of the pressure sensor 14 into account. The error produced by the calculation is only due to a change of the sensitivity coefficient of the sensor 14. The reading represents the variation which must be taken into account by a user in his actual reading if the original sensitivity coefficient has not been replaced by the new calibration sensitivity coefficient found previously in the equations.

It is finally possible to find an elevation of the water level A corrected by taking both possible error variations into account, namely the change of the sensitivity coefficient and the offset factor of the pressure sensor 14:

$E_{A_{AN,CN}} = E_{A_{B,C}} - C_{K_{B,C}} - C_{D_{B,C}}$, $E_{A_{AN,CN}}$ representing the elevation of the water level A corrected due to the offset of the sensor and/or to the variation of the calibration coefficient, calculated with a reading in B and in C, respectively, in meters.

The equation takes both individual corrections into account in order to indicate the proper measurement elevation of the water level A. These readings represent the result of the final and corrected elevation of the water A, in the case where the original sensitivity coefficient has not been replaced by the new calibration sensitivity coefficient. The offset factor error of the pressure sensor 14 is maintained throughout this process.

The apparatus may comprise a second measurement sensor with its own pneumatic linking tube having the same characteristics as the primary sensor (not illustrated). The purpose of this second measurement point is essentially to validate the reading of the primary sensor. The operator may insert, if desired, a level difference or acceptable gauge between the readings of the sensors, thereby ensuring a certain validity of the reading in the case where a reading would appear doubtful. This process can be managed by the apparatus itself, indicating then to the operator if the reading is good or doubtful.

The apparatus thus allows to have accurate and reliable level readings, to minimize the long-term maintenance cost of the measurement apparatus, to minimize the installation and handling costs of the measurement apparatus. The apparatus may have a hardware and software design responding to the technological criteria of the years 2000, and an excellent quality/price.

The apparatus will thereby be capable to correct, electronically or by preprogrammed calculation methods, all the imponderables which may affect the accuracy of the final reading.

The apparatus may be constructed so as to allow to manage its autonomy through rechargeable cells at different operating conditions required by the user and to manage the different calculation algorithms required for its proper operation, to establish a good management of the stored data and parameters, to facilitate a proper communication with a computer, to be user friendly overall. The apparatus may have a water, dust, oil, etc.—proof casing, have only one casing 44 in stainless steel or painted aluminum or PVC, have locks allowing the installation of padlocks (not illustrated), have access to different readings of levels through a display window, have waterproof keyboard keys 52 allowing the users to modify the basic data of the apparatus, have compression glands for all the electrical cable inputs and for the inlet and outlet tubes, have an alphanumeric display (LCD) 46 or the like to permanently indicate the variations and other parameters. It may be lighted and heated if necessary. The complete apparatus should be able to operate at temperatures varying from −55° to +60° C., and should be installable as well on a wall as on a pipe with a base. The measurement apparatus may, for example, be adapted for a 120 VAC power supply, may be adapted to operate with a 12 VDC external cell, may allow a supply source through solar panels or windmills, may be provided with all the connectors or terminals for supply purposes (120 VAC, 12 VDC, solar and windmill), may be provided with a 12 VDC output with screwed terminal, may have a 5 VDC output with a screwed terminal, may have a rechargeable cell capable to withstand a main supply failure for a minimal period of seven (7) days as a function of the operation mode already established by the user, may have a low total consumption (mA) and be provided with a sleep mode device on different components established by the user, may have an automatic device allowing to reduce the taking of readings in case of power failure, may have an automatic alarm device in case of power failure, may have mechanical protecting circuit breakers on the 120 VAC input as well as on the 12 VDC supply. The apparatus can be provided with a compressed air generator capable to generate a proper pressure for all the ranges of the measurement extents mentioned below. A manual device can also be provided in the event that the user would opt for nitrogen bottles in order to generate the pressure. The apparatus may contain all the necessary couplings and valves so that the user may chose himself/herself the operation mode which suits him/her (integrated air generator or nitrogen bottle).

An automatic pressure transfer device can be installed between the compressed air generator and the nitrogen bottles in order to deactivate the pressure generator in the event that the state of the rechargeable cells of the apparatus would have reached a critical threshold (Volt/Amperage). This device would be very useful in particular with the power supply using solar panels or windmills. The same automatic pressure transfer device may be used in the event of failure of the air generator.

Many parameters can be measured in real time, such as the state of the power supply in Volts, the state of the rechargeable cells in Volts, the internal temperature in ° C., the state of the air reserve in kPa, the state of validity of the sensors, their relative or absolute gauge in meters, the variation of the gauge in meters, the relative level in meters, the gradient on the variation speed in meters/mm, the pressure of the air reserve of the auxiliary nitrogen bottles in kPa, etc.

General operation parameters may be used, such as a version number, a signature (random number representing the actual configuration of the apparatus), a positioning (longitude and latitude coordinates), a location (upstream, downstream, body of water, etc.), a site (identification), an installation date, etc.

The design and the assembly of the different components may be achieved in modular fashion so that a quick maintenance of the apparatus can be performed in the event of major or minor failures. The electronic components can be assembled on a surface mount type printed circuit.

The basic apparatus can be arranged to communicate with a local computer system (site) and also to transmit data in a bi-directional fashion with one or many central computers away from the site. All these elements may be integral parts of the measurement apparatus.

With these features and technical performances of the level meter, the reliability of the whole arrangement of the measurement apparatus is significantly improved, in addition to improving the security of the works and of the public.

Many existing level meters can be adapted according to the invention, by adding the valve 16 on the tube 2 and by modifying the programming of the control circuit 20 or else by changing it for performing the previously described verification mode. The valve 28 may also be added if necessary.

Although embodiments of the invention have been illustrated in the attached drawings and described herein above, it will become apparent for persons skilled in the art that changes and modifications can be made to these embodiments without departing from the invention. All such modifications or variants are considered to be within the scope of the invention as defined in the following claims.

What is claimed is:

1. A bubble level meter, comprising:
   a pneumatic tube submersible in part and having opposite lower and upper openings;
   a gas generator connected to the upper opening of the pneumatic tube;
   a pressure sensor connected to the upper opening of the pneumatic tube in order to measure a pressure in the pneumatic tube;
   a deflection valve interposed along the pneumatic tube above and at a predetermined distance from the lower opening, the deflection valve having a port for communication with an external liquid milieu in which a submerged portion of the pneumatic tube is located, and closed and open positions wherein the upper opening of the pneumatic tube communicates respectively with the lower opening of the pneumatic tube and the port of the deflection valve; and
   a control circuit connected to the gas generator, the pressure sensor and the deflection valve, the control circuit being configured for:
      processing pressure measurements obtained from the pressure sensor;
      controlling the deflection valve and the gas generator as a function of preset settings;
      verifying a calibration coefficient of the pressure sensor as a function of the pressure measurements obtained from the pressure sensor when the deflection valve is alternately in closed position and in open position, and as a function of the distance between the lower opening of the pneumatic tube and the port of the deflection valve; and
      generating level data as a function of the processed pressure measurements and the calibration coefficient.

2. The level meter according to claim 1, further comprising:
   an additional deflection valve interposed between the pressure sensor and the upper opening of the pneumatic tube, the additional deflection valve being connected to the control circuit and having a port for communication with an external atmospheric milieu in which an emerged portion of the pneumatic tube is located, and closed and open positions wherein the pressure sensor communicates respectively with the upper opening of the pneumatic tube and the port of the additional deflection valve;
   and wherein the control circuit is further configured for:
      controlling the additional deflection valve as a function of the preset settings; and
      verifying an offset factor of the pressure sensor as a function of the pressure measurements obtained from the pressure sensor when the additional deflection valve is alternately in closed position and in open position, the level data generated by the control circuit being also as a function of the offset factor.

3. The level meter according to claim 2, wherein the control circuit comprises a memory for storing the level data.

4. The level meter according to claim 3, wherein the preset settings are stored in the memory.

5. The level meter according to claim 2, wherein the deflection valves comprise bi-directional solenoid valves under control of the control circuit.

6. The level meter according to claim 2, wherein the pneumatic tube is provided with a protective tube surrounding the pneumatic tube over a length of the pneumatic tube.

7. The level meter according to claim 2, further comprising an enclosure in which the gas generator, the pressure sensor and the control circuit are mounted, the enclosure having a lower opening receiving an upper end of the pneumatic tube comprising the upper opening, and a lateral opening receiving a tube connecting the port of the additional deflection valve with the external atmospheric milieu.

8. The level meter according to claim 1, wherein the control circuit has:
   a normal measurement mode wherein the control circuit sets the deflection valve in closed position and the gas generator in operation for opposing a hydric pressure in the pneumatic tube until obtaining a balanced pressure at the lower opening of the pneumatic tube, and takes a pressure measurement from the pressure sensor when the balanced pressure is reached; and
   a verification mode wherein the control circuit sets the deflection valve along the pneumatic tube in open position for a preset duration, takes a pressure measurement from the pressure sensor at the opening of the deflection valve, and determines the calibration coefficient as a function of the pressure measurement.

9. The level meter according to claim 2, wherein the control circuit has:
   a normal measurement mode wherein the control circuit sets the deflection valves in closed position and the gas generator in operation for opposing a hydric pressure inside the pneumatic tube until obtaining a balanced pressure at the lower opening of the pneumatic tube, and takes a pressure measurement from the pressure sensor when the balanced pressure is reached;
   a first verification mode wherein the control circuit sets the deflection valve along the pneumatic tube in open position for a preset duration, takes a pressure measurement from the pressure sensor at the opening of the deflection valve, and determines the calibration coefficient as a function of the pressure measurement; and
   a second verification mode wherein the control circuit sets the additional deflection valve between the upper opening of the pneumatic tube and the pressure sensor in open position for a preset duration, takes a pressure measurement from the pressure sensor at the opening of the additional deflection valve, and determines the offset factor as a function of the pressure measurement.

10. The level meter according to claim 9, wherein, in the first verification mode, the control circuit ensures that the additional deflection valve between the upper opening of the pneumatic tube and the pressure sensor is in closed position before the opening of the deflection valve along the pneumatic tube, and in the second verification mode, the control circuit ensures that the deflection valve along the pneumatic tube is in closed position before the opening of the additional deflection valve between the upper opening of the pneumatic tube and the pressure sensor.

11. The level meter according to claim 2, wherein the control circuit is provided with a display.

12. The level meter according to claim 1, further comprising a supplementary deflection valve interposed along the pneumatic tube between the lower opening of the pneumatic tube and the deflection valve already in place, the supplementary deflection valve having a port for communication with the external liquid milieu, and closed and open positions wherein the upper opening of the pneumatic tube communicates respectively with the lower opening of the pneumatic tube and the port of the deflection valve, the control circuit being configured for operating the deflection valves independently.

13. A method for improving pressure measurements in a bubble level meter comprising a pneumatic tube submersible in part having opposite lower and upper openings, a gas generator connected to the upper opening of the pneumatic tube, a pressure sensor connected to the upper opening of the pneumatic tube, and a control circuit connected to the gas generator and the pressure sensor and configured for processing measurements obtained from the pressure sensor and generating level data as a function of the processed measurements, the method comprising:

interposing a deflection valve along the pneumatic tube above and at a predetermined distance from the lower opening, the deflection valve having a port for communication with an external liquid milieu in which a submerged portion of the pneumatic tube is located, and closed and open positions wherein the upper opening of the pneumatic tube communicates respectively with the lower opening of the pneumatic tube and the port of the deflection valve;

connecting the deflection valve to the control circuit; and configuring the control circuit for:
  controlling the deflection valve as a function of preset settings;
  verifying a calibration coefficient of the pressure sensor as a function of pressure measurements obtained from the pressure sensor when the deflection valve is alternately in closed position and in open position, and as a function of the distance between the lower opening of the pneumatic tube and the port of the deflection valve; and
  generating the level data as a function of the calibration coefficient.

14. The method according to claim 13, further comprising:

interposing an additional deflection valve between the pressure sensor and the upper opening of the pneumatic tube, the additional deflection valve having a port for communication with an external atmospheric milieu in which an emerged portion of the pneumatic tube is located, and closed and open positions wherein the pressure sensor communicates respectively with the upper opening of the pneumatic tube and the port of the additional deflection valve;

connecting the additional deflection valve to the control circuit; and configuring the control circuit for:
  controlling the additional deflection valve as a function of the preset settings;
  verifying an offset factor of the pressure sensor as a function of the pressure measurements obtained from the pressure sensor when the additional deflection valve is alternately in closed position and in open position; and
  generating the level data as a function of the offset factor.

15. The method according to claim 14, further comprising:

storing the level data in a memory of the control circuit.

16. The method according to claim 14, wherein the control circuit performs a level measurement by proceeding successively by:

a setting of the additional deflection valve between the pressure sensor and the upper opening of the pneumatic tube into open position when the deflection valve along the pneumatic tube is in closed position;

a determination of the offset factor of the pressure sensor as a function of a measurement obtained from the pressure sensor;

a setting of the additional deflection valve between the pressure sensor and the upper opening of the pneumatic tube in closed position;

a setting into operation of the gas generator for opposing a liquid pressure in the pneumatic tube until obtaining a balanced pressure at the lower opening of the pneumatic tube;

a processing of a first measurement obtained from the pressure sensor corresponding to a reading of pressure at the lower opening of the pneumatic tube;

a setting of the deflection valve along the pneumatic tube in open position;

a processing of a second measurement obtained from the pressure sensor corresponding to a reading of pressure at the port of the deflection valve along the pneumatic tube;

a setting of the deflection valve along the pneumatic tube back in closed position, a determination of the calibration coefficient as a function of a difference between the first and second measurements; and a generation of the level data based on the pressure measurements as a function of the calibration coefficient and of the offset factor.

* * * * *